United States Patent [19]
Kubicek

[11] 3,728,404
[45] Apr. 17, 1973

[54] SPIRO COMPOUNDS

[75] Inventor: Donald H. Kubicek, Bartlesville, Okla.

[73] Assignee: Phillips Petroleum Company, Bartlesville, Okla.

[22] Filed: June 6, 1968

[21] Appl. No.: 734,852

[52] U.S. Cl.............260/648 D, 260/999, 260/348.5
[51] Int. Cl..........................C07c 17/32, C07c 23/04
[58] Field of Search...............260/648, 648 F, 648 C, 260/648 D

[56] References Cited

UNITED STATES PATENTS

| | | | |
|---|---|---|---|
| 3,338,978 | 8/1967 | Moore, Jr. | 260/648 D |
| 3,363,012 | 1/1968 | Norell | 260/648 D |
| 3,265,714 | 8/1966 | Robinson | 260/648 D |
| 3,265,743 | 8/1966 | Robinson | 260/648 D |
| 3,265,744 | 8/1966 | Robinson | 260/648 D |

OTHER PUBLICATIONS

Kung et al., J. Org. Chem. 29, 2,739–2,740 (1964)
Funakubo et al., Chemical Abstracts, 13,638c (1962)

*Primary Examiner*—Daniel D. Horwitz
*Attorney*—Young and Quigg

[57] ABSTRACT

Spiro compounds having a cyclopropane ring and a ring containing an olefinic double bond are prepared by dihalocarbene addition to certain unsaturated cyclic hydrocarbons.

8 Claims, No Drawings

SPIRO COMPOUNDS

BACKGROUND OF THE INVENTION

This invention relates to novel spiro compounds. In another aspect, this invention relates to a process for making novel spiro compounds by the addition of dihalocarbenes to certain cycloolefins.

Halogen substituted cyclopropane compounds have been found to be useful as insect repellents and fungicides. Therefore, it is desirable to obtain compounds having cyclopropane rings, particularly halogen containing cyclopropane rings for use as fungicidal agents and insect repellents and as intermediates for such agents. Also such compounds, by virtue of the olefinic double bond, are useful as intermediates in the production of epoxides for epoxy resins.

SUMMARY OF THE INVENTION

Accordingly, one object of this invention is to provide a novel spiro compound containing a cyclopropane ring therein.

Another object of this invention is to provide a novel spiro compound containing a halogenated cyclopropane ring, and a process for making the same.

Yet another object of this invention is to provide a novel spiro compound containing a cyclopropane ring and a ring having a double bond.

A further object of this invention is to provide novel spiro compounds and a process for making the same.

According to the invention, spiro compounds that possess the above-mentioned cyclopropane structure are produced by dihalocarbene addition to certain cycloolefinic compounds.

DESCRIPTION OF THE PREFERRED EMBODIMENTS

A spiro compound is one which contains at least two rings and in which a single carbon atom is common to both rings. Therefore, in accordance with the invention, unsaturated cyclic hydrocarbons having the general formula

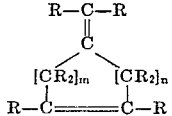

are contacted under reaction conditions with a carbene having the general formula $:CX_2$ to produce spiro compounds having the general formula

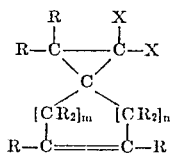

wherein R is hydrogen or an alkyl, aryl, or cycloalkyl radical, and combinations of these such as aralkyl or alkaryl having up to about 20 carbon atoms; $m$ and $n$ are either 1, 2, 3, or 4 with the sum of $m$ and $n$ being no more than 5; X is chlorine, bromine, fluorine, or iodine; and the total number of carbon atoms in the molecule is no more than about 40.

Examples of the unsaturated cyclic hydrocarbons which are suitable for use in the present invention are:
4-ethylidenecyclohexene
4-ethylidenecyclopentene
4-methylidenecyclohexene
4-propylidenecyclopentene
5-isobutylidenecycloheptene
2,3-dimethyl-4-decylidenecyclohexene
3-cyclopentyl-5-(1-ethyldodecylidene)cyclooctene
2-benzyl-5-methyl-4-(1-heptyloctylidene)cyclohexene
2-phenyl-4-(1-phenylbenzylidene)cyclopentene
1-eicosyl-4-(1-pentylheptylidene)cyclohexene
1,2,3,5,6-pentamethyl-4-(1-methylethylidene)cyclohexene
and the like and mixtures thereof.

Some examples of the spiro compounds which are the products of the invention are:
1,1-dichloro-2-methylspiro[2.5]octene-5
1,1-dibromo-2-methylspiro[2.4]heptene-5
1,1-diiodospiro[2.5]octene-5
1,1-difluoro-2-ethylspiro[2.4]heptene-5
1,1-dichloro-2-isopropylspiro[2.6]nonene-6
1,1-dibromo-2-nonyl-4,5-dimethylspiro[2.5]octene-5
1,1-dichloro-2-ethyl-2-undecyl-5-cyclopentylspiro[2.7]decene-6
1,1-diiodo-2,2-dioctyl-5-benzyl-8-methylspiro[2.5]octene-5
1,1-dichloro-2,2,5-triphenylspiro[2.4]heptene-5
1-chloro-1-bromo-2-pentyl-2-hexyl-6-eicosylspiro[2.5]octene-5
1,1-dichloro-2,2,4,5,6,7,8-heptamethylspiro[2.5]octene-5
and the like and mixtures thereof.

A dihalocarbene is a divalent carbon intermediate which cannot be isolated but which can be generated in situ by several conventional methods such as by the photolysis or base treatment of suitable halogen-containing carbene precursors. For example, the dihalocarbene is obtained by base treatment of certain halogenated compounds such as chloroform, bromoform, iodoform, dichloromethane, dibromofluoromethane, dibromomethane, bromotrichloromethane, dichloroacetic acid, dichloroacetone, pentachloroacetone, difluoromethane, and the like, and mixtures thereof. A variety of basic compounds can be utilized to convert the halogen-containing compounds to the dihalocarbene, such as: potassium tertiary butoxide, sodium isopropoxide, elemental potassium, lithium propoxide, aluminum butoxide, lithium hydroxide, potassium hydroxide, magnesium ethoxide, sodium methoxide, butyllithium, and the like and mixtures thereof.

Any conventional method, which is compatible with the reaction conditions of the present invention, for generating dihalocarbenes can be used. It is presently preferred, however, to utilize the treatment of haloforms with alkali metal alkoxides.

According to the process of the invention, one mole of the cycloolefinic compound is contacted with about one mole of the dihalocarbene to obtain one mole of the spiro product, although proportions both above and below this value can be used; for instance, a mole ratio of dihalocarbene to cycloolefinic compound is generally in the range of 0.5:1 to 1.1:1, although higher and lower ratios could be employed. It is presently preferred to utilize at least slightly more than one mole of the cycloolefinic compound per mole of the dihalocarbene. The amount of dihalocarbene available for reaction will depend, of course, upon the amount of its precursor present. One mole of the dihalocarbene precursor is required to generate one mole of the dihalocarbene. When generation by treatment of a chlorinated compound with a basic compound is used, one mole of a base, such as an alkali metal alkoxide, is required for each mole of chlorinated compound, such as a haloform to generate one mole of the dihalocarbene. Thus, the reaction of the present invention is carried out by mixing, under reaction conditions, appropriate amounts of the cycloolefinic compound, the dihalocarbene precursor, and a compound to convert the carbene precursor to the carbene. In reactions where these compounds are not simultaneously introduced, the order of addition is preferably such that the dihalocarbenes are not generated without the presence of some of the cycloolefinic compound, that is, either the dihalocarbene precursor or the precursor converting agent is added lastly.

The reaction can be carried out continuously or batchwise from about −80° to about +25° C., preferably from about −20° to about 0° C., using any conventional contacting apparatus either in the presence or absence of a diluent. Any diluent such as alcohols, ethers, alkanes, and the like which are inert under the conditions of the reaction can be used for this purpose. The reaction time can vary, depending upon the contacting technique used, from about 1 minute to about 20 hours. It is frequently convenient to slowly add the dihalocarbene precursor to a previously prepared mixture of the cycloolefinic compound and the precursor converting agent.

At the completion of the reaction the products can be recovered and isolated by any conventional technique. For example, the reaction mixture can be treated with water to separate out the inorganic components, and then fractionated to yield the spiro products.

This invention will become more readily apparent from consideration of the following examples.

EXAMPLE I

The preparation of 1,1-dichloro-2-methylspiro[2.5]octene-5 was affected as follows: The potassium tertiary butoxide agent was first prepared by reacting 17 parts by weight of metallic potassium with 240 parts by weight dry tertiary butyl alcohol. Ethyl alcohol (78 parts by weight) was then added to dissolve the potassium tertiary butoxide. To this solution was added 92 parts by weight of 95 percent pure 4-ethylidenecyclohexene. The resulting solution was then cooled to −4° C., and 104 parts by weight chloroform was slowly added over a period of 45 minutes, while the solution was being constantly stirred. The mixture was then allowed to come to room temperature and was stirred for an additional 3 hours.

This mixture was then poured into 300 parts by weight of water and the organic layer was salted out with sodium chloride. The organic layer was distilled to give 28 grams (37 percent yield based on the 4-ethylidenecyclohexene) of 1,1-dichloro-2-methylspiro[2.5]octene-5 having a boiling point of 62° C. at a pressure of 1 millimeter of mercury. The nuclear magnetic resonance spectrum of this compound was consistent with the structure of 1,1-dichloro-2-methylspiro[2.5]octene-5. The nuclear magnetic resonance spectrum had no doublet near 8.4 τ indicating no methyl group alpha to a double bond thus excluding the structure

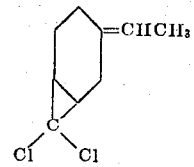

Further identification was provided by elemental analysis as follows:

| Element | Calculated for $C_9H_{11}Cl_2$ | Found |
|---|---|---|
| C | 56.6 | 56.7 |
| H | 6.35 | 6.4 |
| Cl | 37.05 | 36.9 |

EXAMPLE II

The 1,1-dichloro-2-methylspiro[2.5]octene-5 of Example I is reacted with peracetic acid in a conventional manner to epoxidize this compound as shown by the following equation:

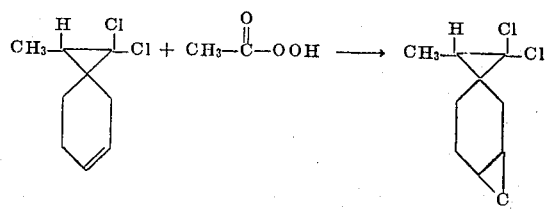

Such reactions for epoxidizing cyclic olefins are well known; for instance, Kirk-Othmer, Vol. 8, page 249 (1965), shows such a reaction for 4-vinylcyclohexene. The resulting epoxide is useful as a molding compound as is well known in the art. It is cured, for instance, by reacting it with an acid anhydride in a manner well known for epoxidized olefin type epoxy resins as shown, for instance, in Modern Plastics Encyclopedia, Vol. 44 (1966), page 168.

While this invention has been described in detail for the purpose of illustration, it is not to be construed as limited thereby but is intended to cover all changes and modifications within the spirit and scope thereof.

I claim:

1. A process for making spiro compounds having the formula

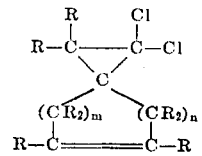

by reacting an unsaturated hydrocarbon having the formula

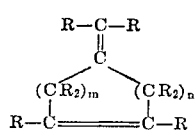

with a carbene having the formula : $CCl_2$ wherein R is hydrogen or a hydrocarbon radical selected from the group consisting of alkyl, aryl, cycloalkyl and combinations thereof, having from one to 20 carbon atoms; $m$ and $n$ are integers from 1–4, the sum of $m$ plus $n$ being no more than 5, and the total number of carbon atoms in the molecule being no more than 40; said reaction being carried out at a temperature between −80° and +25°C.

2. The process of claim 1 carried out in a temperature range from −20° to 0° C.

3. The process of claim 1 wherein said unsaturated hydrocarbon is 4-ethylidenecyclohexene and said spiro compound is 1,1-dichloro-2-methylspiro-[2.5]octene-5.

4. The method of claim 1 wherein the mole ratio of said carbene to said unsaturated hydrocarbon is within the range of 0.5:1 to 1.1:1.

5. The method according to claim 1 wherein said carbene is generated in situ from the reaction of a carbene precursor.

6. The method according to claim 1 wherein said carbene is generated in situ by the base treatment of chloroform.

7. Spiro compounds having the formula

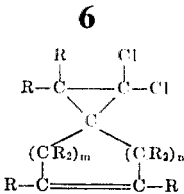

wherein R is hydrogen or a hydrocarbon radical selected from the group consisting of alkyl, aryl, cycloalkyl and combinations thereof, having from one to 20 carbon atoms; and $m$ and $n$ are integers from 1–4, the sum of $m$ plus $n$ being no more than 5, and the total number of carbon atoms in the molecule being no more than 40.

8. The compound of claim 7 having the formula

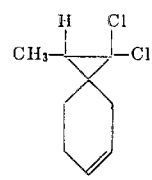

* * * * *